United States Patent [19]

Okajima

[11] 4,320,628
[45] Mar. 23, 1982

[54] QUICK AIR COOLING SYSTEM FOR USE WITH AUTOMOTIVE VEHICLE AIR CONDITIONER

[75] Inventor: Masao Okajima, Yokohama, Japan
[73] Assignee: Nissan Motor Co., Ltd., Yokohama, Japan
[21] Appl. No.: 194,312
[22] Filed: Oct. 6, 1980
[51] Int. Cl.³ .................... F25D 17/04; F25B 25/00
[52] U.S. Cl. ........................ 62/186; 62/244; 62/332; 165/16
[58] Field of Search ............... 62/332, 410, 411, 244, 62/186; 165/16; 236/91 G

[56] References Cited

U.S. PATENT DOCUMENTS

| | | | |
|---|---|---|---|
| 2,036,868 | 4/1936 | Grant | 165/16 X |
| 3,315,730 | 4/1967 | Weaver et al. | 165/23 |
| 3,428,115 | 2/1969 | Caldwell | 165/23 |
| 3,934,642 | 1/1976 | Coulson et al. | 165/43 X |
| 4,245,481 | 1/1981 | McDermott | 62/411 X |

FOREIGN PATENT DOCUMENTS 23052 1/1981 European Pat. Off.
2939954 4/1980 Fed. Rep. of Germany .
2941305 4/1980 Fed. Rep. of Germany .
1527905 10/1978 United Kingdom .

OTHER PUBLICATIONS

Summary dated Jun. 24, 1980 of Japanese Pat. Pub. No. 55-47913.
Research Disclosure dated May 1980.

*Primary Examiner*—William E. Wayner
*Attorney, Agent, or Firm*—Thompson, Birch, Gauthier & Samuels

[57] ABSTRACT

A quick system for use with an automotive vehicle air conditioner. The air conditioner has a first air intake port opening to the vehicle interior and a second air intake port opening to the vehicle exterior, and an air intake valve for selectively alternatively closing the air intake ports. When the air conditioner switch 1 is turned on or closed, a valve actuator for the air intake valve shifts the air intake valve to alternatively close the air intake ports to admit into the air conditioner the lower temperature air between air within the vehicle interior and air within the vehicle exterior, to shorten the time required for air cooling within the vehicle interior.

3 Claims, 2 Drawing Figures

QUICK AIR COOLING SYSTEM FOR USE WITH AUTOMOTIVE VEHICLE AIR CONDITIONER

BACKGROUND OF THE INVENTION

The present invention relates to a system for use with an automotive vehicle air conditioner to effect quick air cooling.

According to the conventional art, the vehicle interior art is admitted into an air conditioner to carry out the maximum air conditioning. However, if the vehicle is left under high temperature, the vehicle interior temperature is likely to become considerably higher than the vehicle exterior temperature. If solar radiation is excessively strong, this temperature difference increases by as much as 20° C. Thus, if the hotter vehicle interior air is admitted to the air conditioner, it takes a longer time to air cool the vehicle interior. Thus, it is the ordinary practice to exchange the vehicle interior art with the vehicle exterior air by lowering the vehicle window glass before the air conditioner is put into operation. However, the time required for air cooling is still long and not satisfactory.

SUMMARY OF THE INVENTION

According to the present invention, the vehicle interior and exterior air temperatures are sensed and compared. An air intake valve of an automotive vehicle air conditioner is actuated by a valve actuator in response to the sensed temperatures to alternatively close ports opening to the vehicle interior and exterior, respectively, to utilize either the air inside or outside the vehicle, depending on which has the lowest temperature or within the vehicle exterior. Thus, quick air cooling is possible.

Accordingly, an object of the present invention is to provide a system for use with an automotive vehicle air conditioner whereby quick air cooling is possible, viz., the time required for air cooling the vehicle interior is considerably shortened.

DETAILED DESCRIPTION OF THE INVENTION

Figure 1:
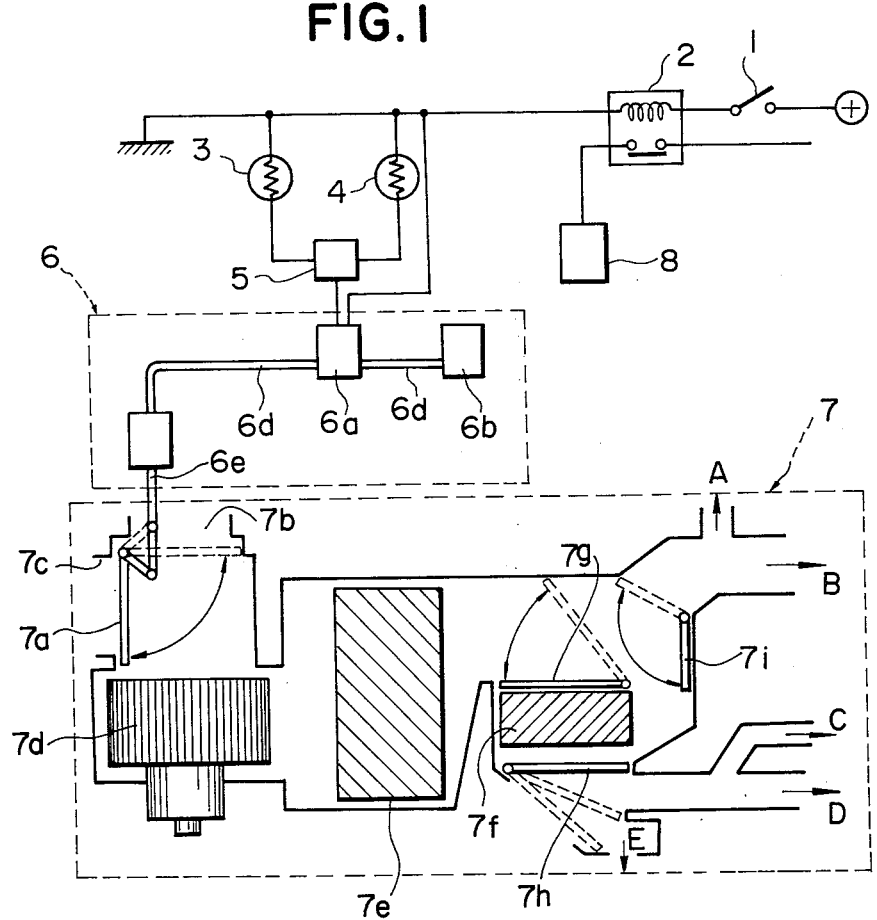
FIG. 1 is a diagrammatic view of an automotive vehicle air conditioner coupled with a system according to the present invention.
Figure 2:
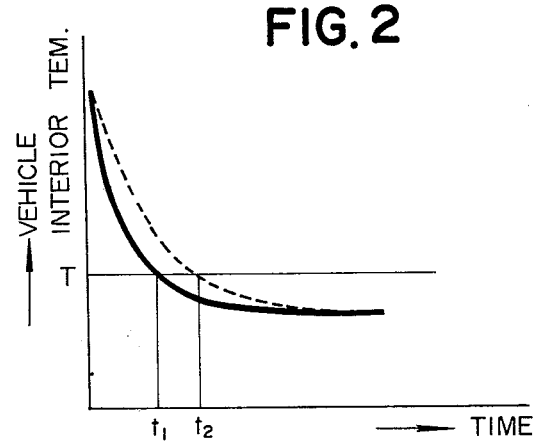
FIG. 2 is vehicle interior temperature vs. time curve showing the time required for air cooling the vehicle interior after the air conditioner is put into operation, one (shown by the dashed curve) being in the case without the system according to the present invention, the other (shown by the solid curve) being in the case with the system according to the present invention.

Referring to FIG. 1, the reference numeral 1 indicates an air conditioner switch, 2 indicates a relay for a compressor driving circuit 8, 3 indicates a vehicle interior air sensor for sensing the air temperature within the vehicle interior, viz., within the vehicle passenger compartment, 4 indicates a vehicle exterior air sensor for sensing the air temperature outside the vehicle, 5 indicates a comparator for comparing the sensed temperatures by the sensors 3 and 4. 6 indicates an actuator for shifting an air intake valve 7a of an air conditioner 7 to alternatively close a first port 7c opening to the vehicle exterior and a second port 7b opening to the vehicle interior. The actuator 6 comprises a solenoid valve 6a, a source of vacuum 6b, and a vacuum actuator 6c. The solenoid valve 6a is closed in response to a first signal from the comparator 5, indicating that the air temperature within the vehicle exterior is lower than that within the vehicle exterior, whereas, it is opened in response to a second signal from the comparator 5 indicating that air temperature within the vehicle exterior is higher than that within the vehicle interior, viz., the vehicle interior air is cooler than the vehicle exterior air. When the solenoid valve 6a is closed, vacuum from the vacuum source 6b to the vacuum actuator 6c is cut and air is admitted thereto, the vacuum actuator 6c assumes an inoperative state. In this state, the vacuum actuator shifts the valve 7a to close the port 7b (dashed line position) to allow the vehicle exterior air only into the air conditioner 7. When the solenoid valve 6a is opened to the vacuum source 6b, the vacuum actuator 6c assumes an operative state to shift the valve 7a to close the port 7c (solid line position), allowing the vehicle interior air only into the air conditioner 7. Reference numeral 6d indicates a vacuum conduit between the vacuum source 6d and the vacuum actuator 6c and the reference numeral 6e indicates an actuating rod of the vacuum actuator.

The air conditioner 7 comprises the first port 7c opening to the vehicle exterior and the second port 7b opening into the vehicle interior and the air intake valve 7a for selectively alternatively closing the ports 7b and 7c. The air intake valve 7a is shifted to alternatively close the ports 7b and 7c by the actuator rod 6e of the vacuum actuator 6c. The reference numeral 7d indicates a fan, 7e an evaporator, 7f a heater core, 7g an air mix door to close the heater core when air cooling is effected, 7h a floor door to close a side window demister/defogger G, a defroster D, and a floor E side when air-cooling is effected, 7i a vent door which is opened to deliver cooling air to a center ventilator B and a side ventilator A.

The operation will be hereinafter explained.

When the air conditioner switch 1 is turned on, the inside air sensor 3 and the outside air sensor 4 are put into operation to start sensing the vehicle interior and exterior air temperatures, and the comparator 5 starts comparing the sensed temperatures. If the comparator 5 produces a signal indicating that the vehicle exterior temperature is lower than the vehicle interior temperature, the solenoid valve 6a is closed upon receipt of this signal, thus cutting off the vacuum from the source 6b to the vacuum actuator 6c, with the result that the vacuum actuator 6c is left inoperative to shift the air intake valve 7a to close the port 7b, thereby to allow the admission of the vehicle exterior air only into the air conditioner 7.

Under this condition, the outside air admitted via the air intake door is delivered by the fan 7d to the evaporator 7e to be cooled therein and then allowed to flow into the inside of the vehicle via the center ventilator B and the side ventilator A.

As the effect of air cooling renders the vehicle interior temperature relatively lower than the vehicle exterior temperature, the comparator 5 produces a second signal indicating this state, thus opening the solenoid valve 6a. The opening of the solenoid valve 6a establishes the vacuum from the source 6b. The vacuum actuator 6c upon receiving the vacuum from the source 6b shifts the air intake valve 7a to close the port 7c, thereby allowing the admission of interior air only.

Of course, if the vehicle interior air temperature is lower than the vehicle exterior air temperature upon turning the air conditioner switch 1, the air intake valve 7a is held to the position to allow the admission of vehicle interior air only from the beginning.

FIG. 3 shows time required for cooling the vehicle interior in the case air cooling is effected with the air conditioner according to the present invention (solid curve) and in the case the vehicle interior is air cooled with the air conditioner without the system according to the present invention (dashed curve).

It will be appreciated that the time required for reaching the same temperature has been considerably shortened from $t_2$ to $t_1$.

What is claimed is:

1. A system for use with an automotive vehicle air conditioner having a first air intake port opening into the vehicle interior and a second air intake port opening to the vehicle exterior and an air intake valve for selectively alternatively closing said air intake ports, said system comprising:
   (a) first sensor for sensing the air temperature within the vehicle interior;
   (b) second sensor for sensing the air temperature outside the vehicle;
   (c) comparator for comparing the two sensed temperatures; and
   (d) valve actuator for shifting the valve to alternatively close said air intake ports,
   said comparator being constructed to send an output signal to said valve actuator indicating which of the vehicle interior air and the vehicle exterior air is a lower temperature than the other, and said valve actuator actuates the air intake valve to open the air intake port opening to the lower temperature one.

2. The system as claimed in claim 1, wherein the air intake valve normally closes the port to the vehicle interior, and said comparator sends the output signal to open the air intake port to the vehicle interior only when the vehicle interior temperature is lower than the vehicle exterior temperature.

3. The system as claimed in claim 1, wherein said comparator sends the output signal indicating which of the interior and exterior temperatures is lower, and wherein the actuator actuates the valve accordingly.

* * * * *